United States Patent [19]
Bedja et al.

[11] Patent Number: 6,039,149
[45] Date of Patent: Mar. 21, 2000

[54] COLLAPSIBLE STEP STOOL WITH STEP MOVEMENT GUIDE SYSTEM

[75] Inventors: Abdelkrim Bedja; Gregory C. Moser; Raymond P. King, all of Columbus, Ind.

[73] Assignee: Cosco Management, Inc., Wilmington, Del.

[21] Appl. No.: 09/161,186

[22] Filed: Sep. 25, 1998

Related U.S. Application Data

[60] Provisional application No. 60/060,025, Sep. 25, 1997.

[51] Int. Cl.[7] ...................................................... E06C 1/38
[52] U.S. Cl. ............................................... 182/20; 182/165
[58] Field of Search ................................. 182/20, 165, 1, 182/33, 33.1; D25/64, 63, 65

[56] References Cited

U.S. PATENT DOCUMENTS

| | | |
|---|---|---|
| D. 387,878 | 12/1997 | Jacques ...................................... D25/64 |
| 501,694 | 7/1893 | Richards ...................................... 182/1 |
| 2,852,271 | 9/1958 | McDonald . |
| 2,864,542 | 12/1958 | Marryatt . |
| 2,956,638 | 10/1960 | Bustin . |
| 3,224,530 | 12/1965 | King et al. . |
| 3,650,351 | 3/1972 | Schmidt . |
| 3,955,827 | 5/1976 | Wonigar . |
| 3,999,629 | 12/1976 | Schaffer et al. . |
| 4,557,350 | 12/1985 | Wang . |

FOREIGN PATENT DOCUMENTS

| | | | |
|---|---|---|---|
| 3327025 | 2/1985 | Germany ................................. | 182/165 |
| 16525 | 9/1893 | United Kingdom .................... | 182/165 |

*Primary Examiner*—Alvin Chin-Shue
*Attorney, Agent, or Firm*—Barnes & Thornburg

[57] ABSTRACT

A step stool having a front frame member having a bottom end and a rear frame member having a bottom end, the front and rear frame members being coupled together for movement between an opened position in which a bottom end of the front frame member is spaced apart from the bottom end of the rear frame member and a collapsed position in which the bottom ends of the front and rear frame members are positioned to lie adjacent to one another, a step being pivotably coupled to the front frame member for movement between a use position in which the step is oriented at a first angle relative to the front frame member and a storage position in which the step is oriented at a second angle relative to the front frame member, and a generally S-shaped guide track coupled to the step and a follower coupled to the rear frame member to engage the guide track, the follower being arranged for movement along the guide track in curvilinear fashion following the S-shape as the rear frame member moves along the front frame member, and movement of the follower relative to the guide track moves the step between the use and storage positions.

29 Claims, 3 Drawing Sheets

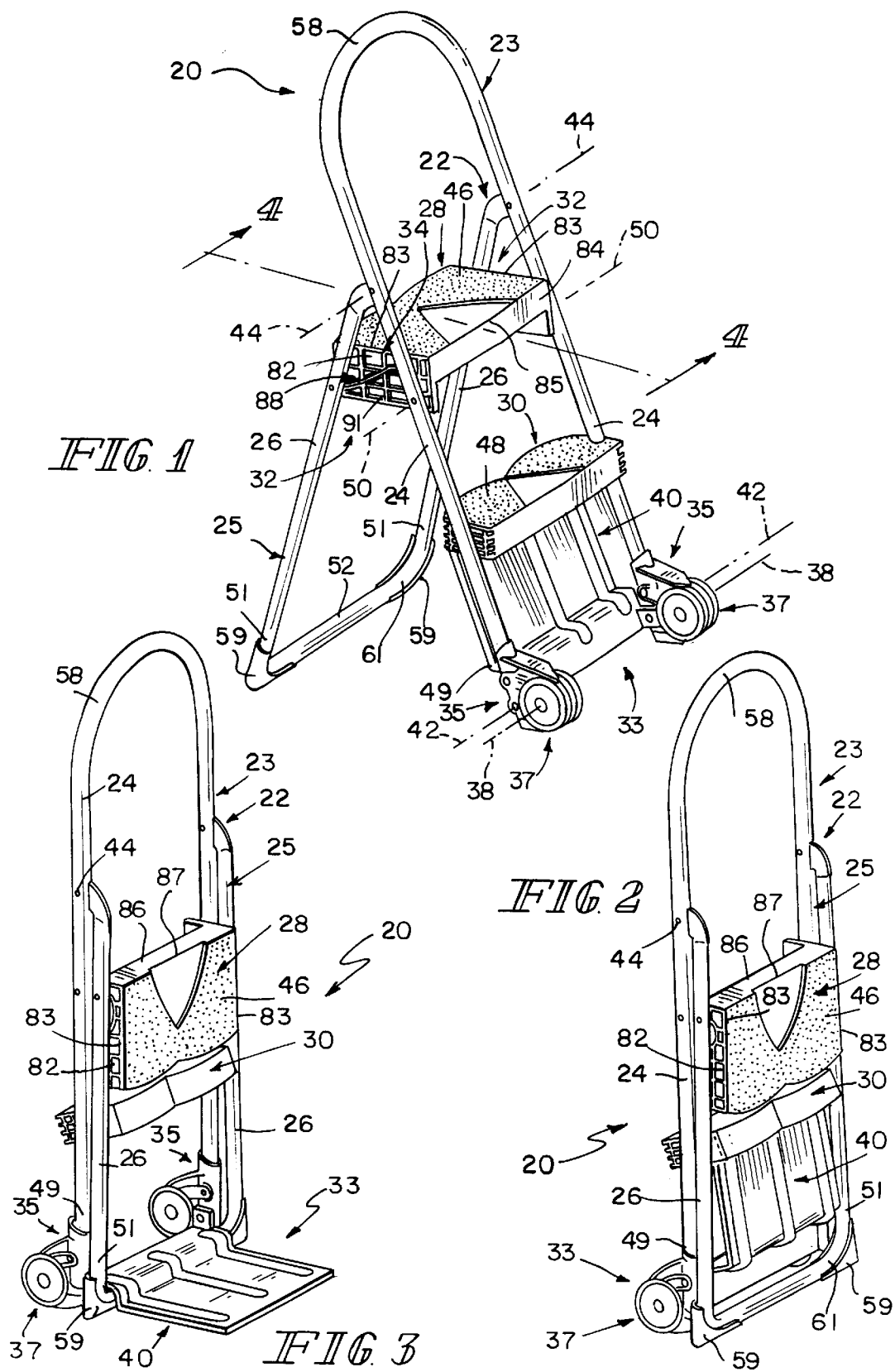

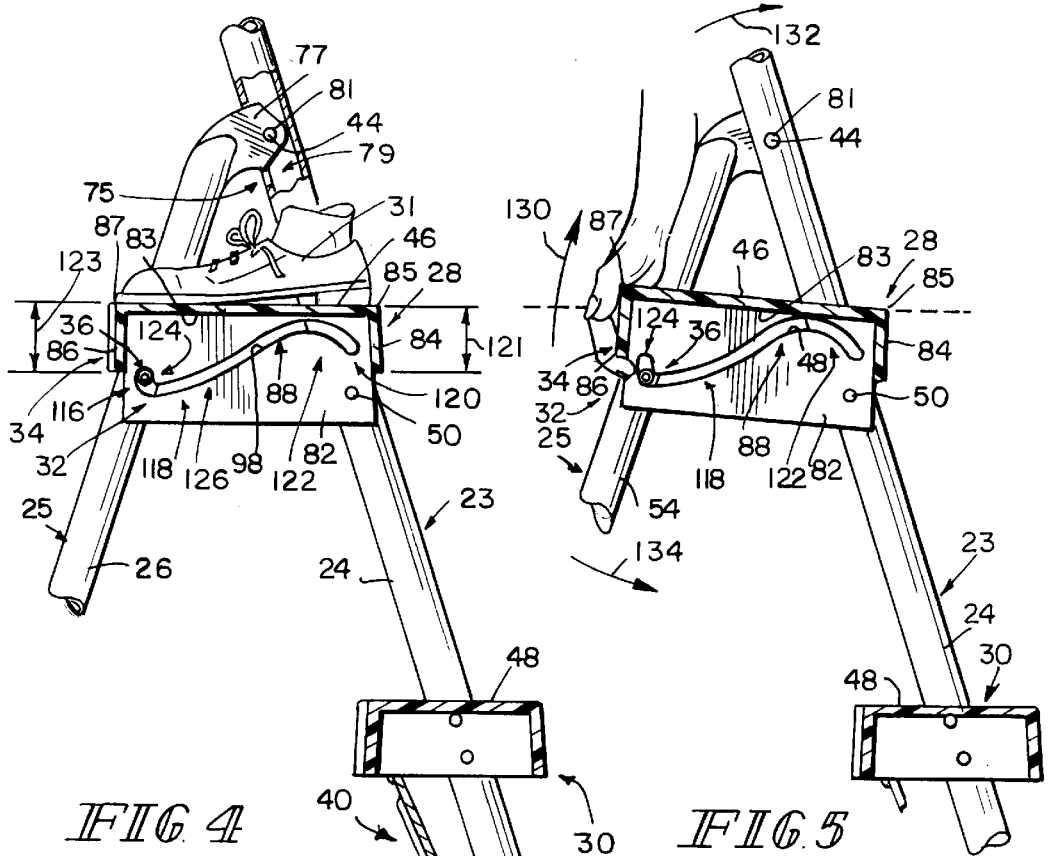
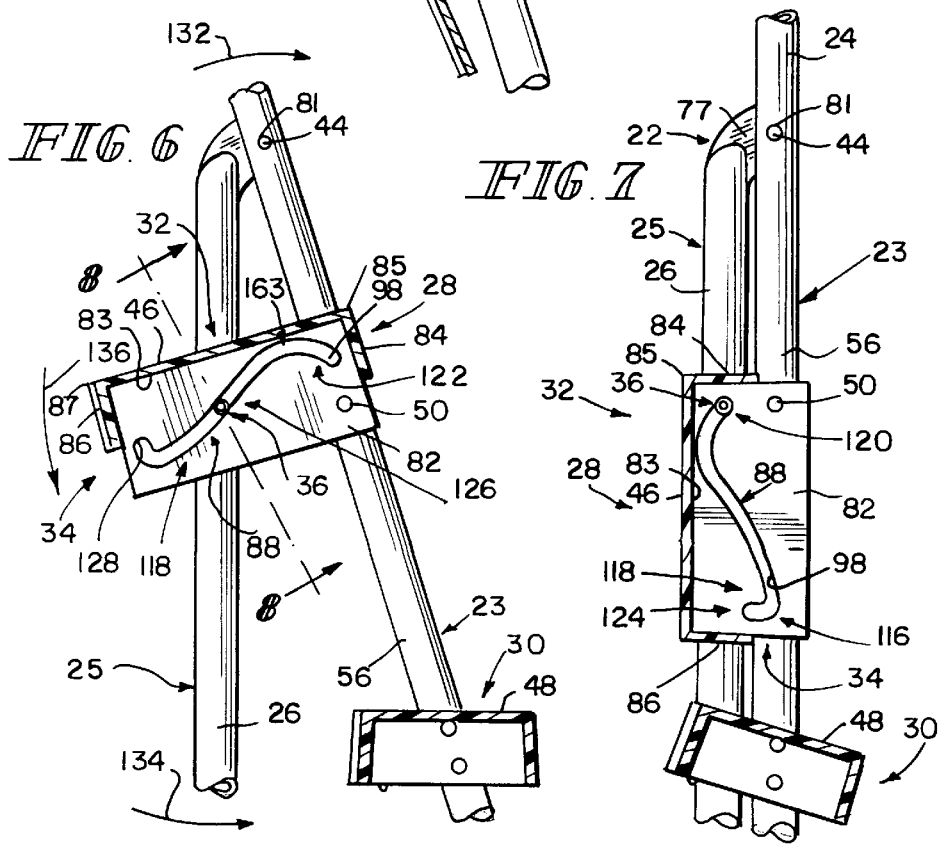

COLLAPSIBLE STEP STOOL WITH STEP MOVEMENT GUIDE SYSTEM

This claims priority under 35 U.S.C. §119(e) to U.S. Provisional Application 60/060,025 filed Sep. 25, 1997.

BACKGROUND AND SUMMARY OF THE INVENTION

The present invention relates to a step stool, and particularly, to a foldable step stool having a frame that folds between an opened use position and a collapsed storage position. More particularly, the present invention relates to a step stool including a frame having a front leg unit and a rear leg unit pivotably coupled to the front leg unit and a top step coupled to the front and rear leg units.

Step stools have a frame and one or more steps that individuals use for elevation when reaching for objects. Individuals also use step stools as a seat for sitting. Step stool frames are often foldable for ease of storage while the step stool is not being used.

According to the present invention, a step stool includes a frame pivotable between an opened and a collapsed position, a step coupled to the frame for movement on the frame, and a guide unit coupled to the step and frame. The guide unit includes a guide and a follower. The guide directs the follower and moves the step smoothly between a horizontal use position and a vertical storage position relative to the frame. As the frame moves from the opened to collapsed positions, the guide unit moves the step from the horizontal use position to the vertical storage position. Thus, the user can manually move the frame and the guide unit automatically moves the step between the use and storage positions.

The frame includes a front frame member and a rear frame member and the guide includes a follower guide slot. The follower guide slot is generally S-shaped and has a first portion that follows a mathematically defined involute curve and a second portion that follows a circular curve. The step is secured in the horizontal use position when the follower is received in a locking notch formed at a rear end of the circular curve. The step can be pivoted upwardly relative to the front frame member to move the follower out of the locking notch and into the first portion of the follower guide slot, thereby allowing the rear frame member to pivot toward the front frame member. The step pivots downwardly relative to the front frame member to the vertical storage position as the rear frame member pivots toward the front frame member.

Additional features of the present invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which:

FIG. 1 is a perspective view of a step stool in accordance with the present invention showing front and rear frame members of the step stool in an opened position, a top step having an upwardly facing top surface supported in a generally horizontal orientation by the front and rear frame members, a bottom step coupled to the front frame member beneath the top step, a dolly unit coupled to the front frame member beneath the bottom step, and a guide unit arranged to control movement of the top step as it moves between use and storage positions;

FIG. 2 is a perspective view of the step stool of FIG. 1 showing the front and rear frame members of the step stool in a collapsed position and the top step moved to a generally vertical orientation having the top surface generally parallel with the front and rear frame members;

FIG. 3 is a perspective view of the step stool of FIG. 2 showing the dolly unit including a dolly plate and being moved to a use position;

FIGS. 4–7 show, in sequence, four illustrations of the step stool as it is moved from the opened position to the collapsed position and show movement of a follower (coupled to the rear frame member as shown, for example, in FIG. 8) in a curved follower guide slot as the step stool is collapsed to move the top step from the horizontal use position to the vertical storage position;

FIG. 4 is a sectional view taken along line 4—4 of FIG. 1, with portions broken away, of the step stool in the opened position showing the front frame member including a front leg and the rear frame member including a rear leg having a top flattened end extending into an interior region of the front leg, the top step including a side wall formed to include a curved follower guide slot, and the follower being received in a locked position in a locking notch of the follower guide slot to lock the top step in the horizontal use position;

FIG. 5 is a sectional view similar to FIG. 4 showing manual movement of the top step as it is being moved upwardly relative to the front leg about a top step pivot axis to move the follower out of the locking notch of the follower guide slot so that the follower is free to move through other portions of the follower guide slot toward an unlocked position;

FIG. 6 is a sectional view similar to FIG. 5 once the follower has moved partly through the follower guide slot to an inflection point of the follower guide slot showing the front and rear frame members positioned to lie in an intermediate position between the opened and collapsed positions, the top step pivoted downwardly relative to the front leg to an inclined orientation between the generally horizontal use position and vertical storage position;

FIG. 7 is a sectional view similar to FIG. 6 once the step stool has been moved to the collapsed position showing the top step in the vertical storage position and showing the follower positioned to lie at an end of the follower guide slot;

DETAILED DESCRIPTION OF THE DRAWINGS

Figure 8:
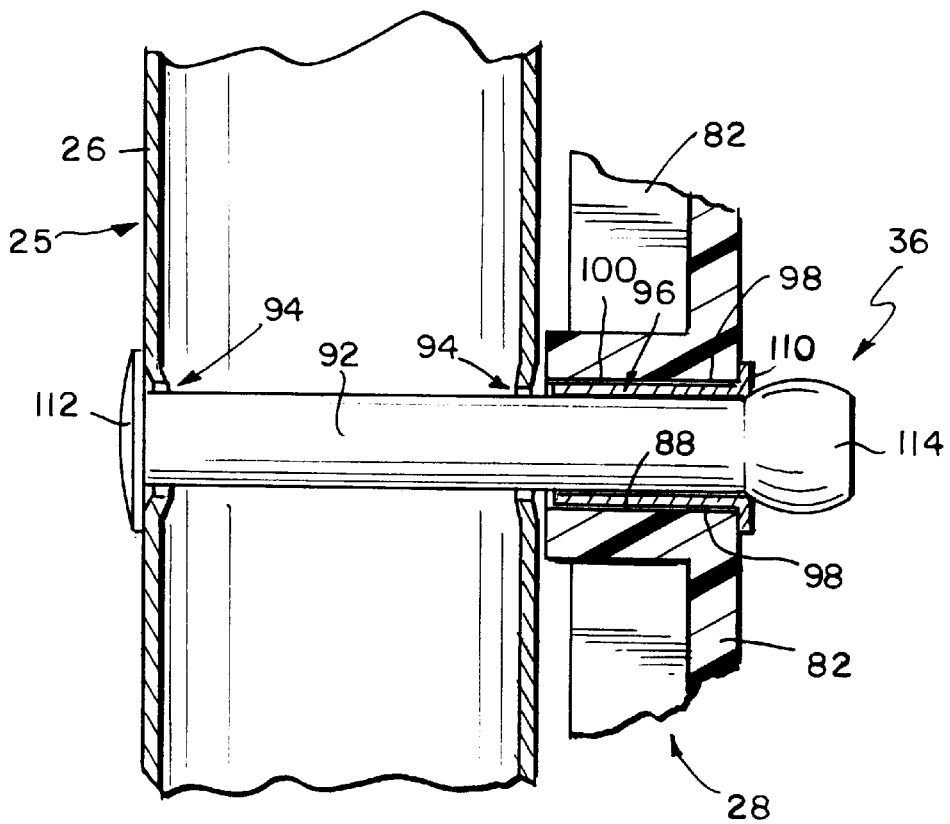
FIG. 8 is a sectional view taken along line 8—8 of FIG. 6 showing the follower including a pin and a flanged roller and showing the pin arranged to extend through apertures formed in the front leg and the roller mounted on a portion of the pin that extends beyond the front leg.

A step stool 20 is shown in an opened position in FIG. 1 and in a collapsed position in FIG. 2. Step stool 20 includes a frame 22 having a front frame member 23 and a rear frame member 25, a foldable top step 28 coupled to front and rear frame members 23, 25, and a stationary bottom step 30. Rear frame member 25 can be pivoted from the opened position shown in FIG. 1 about a pivot axis 44 toward front frame member 23 to assume a collapsed position alongside front frame member 23 as shown in FIG. 2.

A guide unit 32 is coupled to top step 28 and configured to assist top step 28 as it is moved from the horizontal use position shown in FIG. 1 to the vertical storage position shown in FIG. 2 as the step stool 20 is collapsed Guide unit 32 includes a guide 34 on top step 28 and a follower 36 on rear frame member that is moved by guide 34 to transition top step 28 smoothly between an unfolded position (FIG. 1) to a folded position (FIGS. 2 and 3) as frame 22 is folded from the opened position to the closed position. In a preferred embodiment, one guide 34 is formed on each of the two short sides of the top step 28 and two followers 36 are coupled to the rear frame member 25 and arranged so that each of the followers 36 travels in one of the two guides 34 as the step stool 20 is opened and collapsed. An individual is able to fold step stool 20 easily to the closed position by lifting top step 28 to move each follower 36 in its companion guide 34 and by pivoting front frame member 23 toward the user about pivot axis 44 relative to rear frame member 25 without walking around step stool 20 or manipulating a number of different mechanisms.

Referring now to FIG. 1, front frame member 23 includes opposite front legs 24, each having a bottom end 49, and a handle portion 58 extending between front legs 24 spaced-apart from bottom ends 49. Rear frame member 25 includes opposite rear legs 26, each having a bottom end 51, and a strut 52 extending between bottom ends 51. Front and rear frames 23, 25 are coupled to one another for movement about a frame pivot axis 44. When step stool 20 is in the opened position, bottom end 49 of front legs 24 are spaced-apart from bottom ends 51 of rear legs 26 and top step 28 is situated in the horizontal use position, capable of receiving an individual's foot 31, as shown in FIGS. 1 and 4. However, when step stool 20 is in the collapsed position, bottom ends 49, 51 are positioned to lie adjacent to one another and guide unit 32 has operated to guide top step 28 to the vertical storage position, as shown in FIGS. 2 and 3.

Top step 28 is coupled to each front leg 24 for pivoting movement about a top step pivot axis 50. Top step 28 includes a top surface 46 that includes a front edge 85, a rear edge 87, and opposite side edges 83. As shown in FIG. 4, a front wall 84 extends from a front edge 85 of top step and a rear wall 86 extends from rear edge 87. When guide unit 32 positions top step 28 in the horizontal use position, top surface 46 faces handle portion 58 of frame 22. When, however, guide unit 32 positions top step 28 in the vertical storage position, top surface 46 is positioned to lie generally parallel to rear legs 26.

Two guide units 32 are coupled to top step 28 as suggested in FIG. 1. While only one guide unit 32 is illustrated in FIGS. 4–7 and will be discussed hereafter, it is understood that the following description applies to each guide unit 32. Guide unit 32 includes a side wall 82 extending between front and back walls 84, 86 of top step 28. Guide 34 of guide unit 32 is formed in side wall 82. Side wall 82 also includes a plurality of stabilizing ribs 91.

Follower 36 engages or otherwise comes into contact with guide 34 so that follower 36 is guided by or receives motion from guide 34. Thus, guide 34 directs the motion of follower 36. Guide 34 includes a curved follower guide slot 88 formed in each side wall 82. Follower 36 is coupled to rear leg 26 and extends into and follows follower guide slots 88 formed in side wall 82. Each follower 36 includes a pin 92 and a flanged roller 96 as shown in FIG. 8. Each roller 96 functions as a revolving cylinder over which each follower guide slot 88 is moved over each respective pin 92. The description below of one follower 36 is descriptive of both followers 36 unless specifically noted otherwise.

Pin 92 extends through a set of apertures 94 formed in each front leg 24 and roller 96 is mounted for rotation on the portion of pin 92 that extends outwardly away from each respective front leg 24 as shown in FIG. 8. Side wall 82 includes an edge 98 that bounds follower guide slot 88 and roller 96 includes a cylindrical portion 100 that engages edge 98 as shown in FIG. 8. Roller 96 also includes an annular flange 110 extending radially outwardly from cylindrical portion 100. Pin 92 includes a head 112 at one end adjacent to front leg 24 and a bulb 114 at the other end adjacent to annular flange 110. Head 112 and bulb 114 are configured to prevent pin 92 from falling out of follower guide slot 88 and apertures 94. As front and rear frame members 23, 25 are moved between the opened and collapsed positions, pin 92 slides within follower guide slot 88 and engagement between edge 98 and cylindrical portion 100 of roller 96 causes roller 96 to rotate on pin 92.

Follower guide slots 88 are generally similar to one another. Thus, the description below of the interaction between one follower 36 and one follower guide slot 88 is descriptive of the interaction between both followers 36 and both follower guide slots 88. In addition, the description below of the shape of one follower guide slot 88 is descriptive of the shape of both follower guide slots 88.

Figure 9:
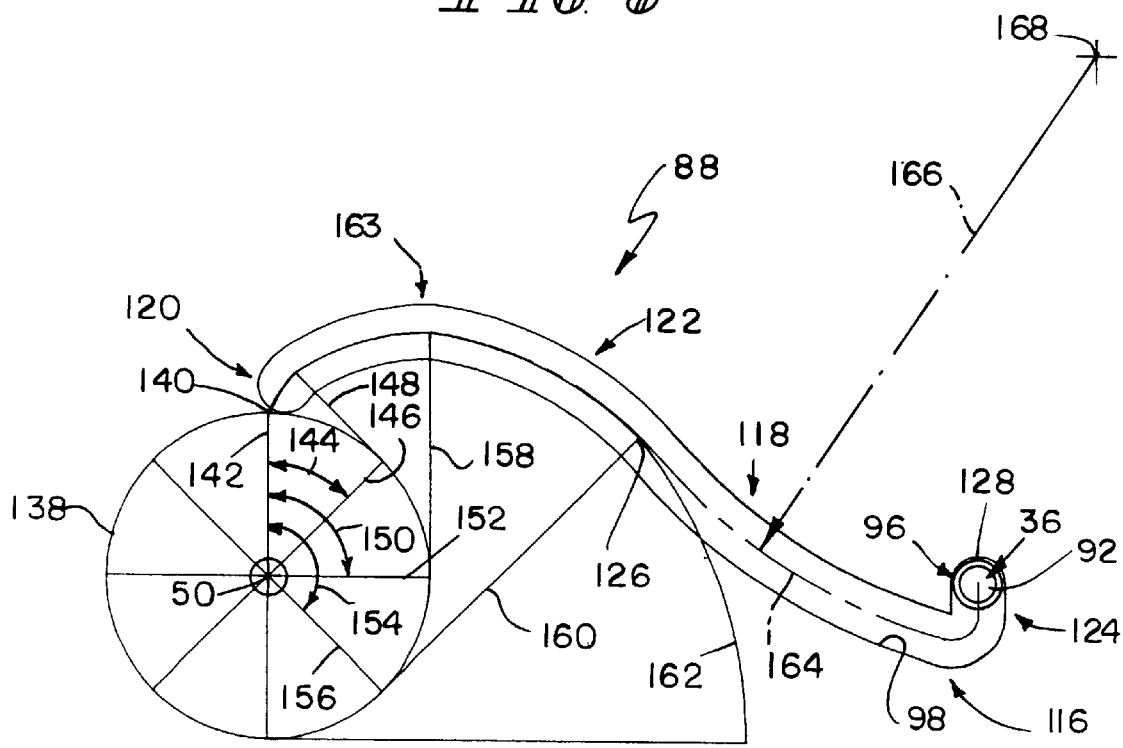
FIG. 9 is an enlarged diagrammatic view of the follower guide slot formed in the top step of the step stool showing a first portion of the follower guide slot following an involute curve defined by a reference circle having a center at the top step fold axis and a circumference tangent to one of the ends of the follower guide slot and showing a second portion of the follower guide slot arranged to follow a circular curve of constant radius.

Follower guide slot 88 includes a curved front or first end 120 adjacent to front wall 84, a curved rear or second end 116 adjacent to rear wall 86, a first portion 122 arranged to extend from front end 120 toward rear wall 86, a second portion 118 arranged to extend from rear end 116 toward first portion 122 and front wall 84, and a hook 124 at rear end 116 as shown, for example, in FIG. 9 formed at an angle to second portion 118 for locking, catching, holding, or otherwise sustaining follower 36 in the first position. First portion 122 of follower guide slot 88 curves in a first direction and second portion 118 of follower guide slot 88 curves in a second direction opposite to the first direction. Thus, follower guide slot 88 is generally S-shaped and first portion 122 meets second portion 118 at an inflection point 126.

Front end 120 of slot 88 is spaced apart from top surface 46 by a first distance 121 and rear end 116 is spaced apart from top surface 46 by a second distance 123 that is greater than first distance 121 as shown, for example, in FIG. 4. Follower guide slot 88 is configured so that, when front and rear frame members 23, 25 are in the opened position and top step 28 is also in a horizontal use position, rear end 116 of slot 88 is generally horizontally aligned with top step pivot axis 50 as also shown in FIG. 4. In addition, front end 120 of slot 88 is positioned to lie above top step pivot axis 50 and is generally vertically aligned therewith when front and rear frame members 23, 25 are in the opened position and top step 28 is in the horizontal use position. Follower guide slot 88 is also configured so that, when front and rear frame members 23, 25 are in the collapsed position and vertically oriented relative to the floor and top step 28 is in the vertical use position, front end 120 of follower guide slot 88 is generally horizontally aligned with top step pivot axis 50 and rear end 116 of follower guide slot 88 is positioned to lie beneath top step pivot axis 50 and is generally vertically aligned therewith as shown in FIG. 7.

When front and rear frame members 23, 25 are in the opened position and top step 28 is in the horizontal use position having top surface 46 facing upwardly in generally parallel relation with top surface 48, follower 36 is received in a locking notch 124, as shown in FIG. 4, and an end portion 128 of edge 98, shown in FIG. 6, engages cylindrical portion 100 of roller 96 to support top step 28 in the horizontal use position. Receipt of follower 36 in locking notch 124 locks front and rear frame members 23, 25 in the opened position and prevents front and rear frame members 23, 25 from moving inadvertently out of the opened position.

First portion 122 of follower guide slot 88 includes an involute curve or involute portion and second portion 118 of slot 88 includes a circular curve or circular portion contiguous with the involute curve and locking notch 124 as shown in FIG. 9. An involute curve is defined as a curve generally traced by a point on a thread kept taut as it is unwound from another curve. With regard to follower guide slot 88, the involute shape of first portion 122 is determined by a reference circle 138 having a center at top step pivot axis 50 and generally tangent to front end 120 of slot 88 as shown in FIG. 9. In addition, the involute shape of first portion 122 of slot 88 starts at an involution initiation point 140 which is defined as the point on reference circle 138 along a coordinate radius 142 arranged to extend from top step pivot axis 50 toward top surface 46 in perpendicular relation therewith. Thus, an involute curve 162 originates at involution initiation point 140 and is defined by reference circle 138.

First portion 122 of slot 88 has a continuum of radii of curvature of varying length as shown in FIG. 9. Each radius of the continuum of radii is tangent to reference circle 138 and has a center that is on reference circle 138. An involution unwrapping angle is defined as the angle between coordinate radius 142 and a radius arranged to extend from top step pivot axis 50 to the tangent point of any particular radius of the continuum of radii extending from reference circle 138 to involute curve 162 which defines first portion of slot 88. For example, a first involution unwrapping angle 144 is defined between coordinate radius 142 and a first radius 146 of reference circle 138, a second involution unwrapping angle 150 is defined between coordinate radius 142 and a second radius 152 of reference circle 138, and a third involution unwrapping angle 154 is defined between coordinate radius 142 and a third radius 156 of reference circle 138.

First portion 122 of slot 88 has a first radius of curvature 148 at first involution unwrapping angle 144, a second radius of curvature 158 at second involution unwrapping angle 150, and a third radius of curvature 160 at third involution unwrapping angle 154 as shown in FIG. 9. Third radius of curvature 160 is larger than second radius of curvature 158 which is larger than first radius of curvature 148. Thus, as the involution unwrapping angle increases, the radius of curvature of involute curve 162 increases. For purposes of illustration, angle 144 is about 45°, angle 150 is about 90°, and angle 154 is about 135°. Angles 144, 150, 154 and the associated radii of curvature 148, 158, 160 are merely representative of the infinite number of involution unwrapping angles and the continuum of radii of curvature that define the involute shape of first portion 122 of follower guide slot 88.

First portion 122 of follower guide slot 88 follows involute curve 162 through an involution unwrapping angle of about 135° as shown in FIG. 9. In addition, first portion 122 of follower guide slot 88 has an apex portion 163 which is the uppermost portion of follower guide slot 88 that is closer to top surface 46 of top step 28 than any other portion of follower guide slot 88. Apex portion 163 is positioned to lie along second radius of curvature 158 which is generally tangent to reference circle 138 and generally parallel to coordinate radius 142.

First portion 122 of follower guide slot 88 ceases to follow involute curve 162 at inflection point 126 and, instead, follows a circular curve 164 defined by a radius 166 of generally constant curvature having a center point 168 as shown in FIG. 9. The position of center point 168 relative to top step pivot axis 50 is chosen to ensure that top step 28 moves smoothly into the horizontal use position as follower 36 travels through follower guide slot 88 from inflection point 126 toward rear end 116 and to ensure that top surface 46 of top step 28 is generally parallel with top surface 48 of bottom step 30 after follower 36 moves from second portion 118 of follower guide slot 88 into locking notch 124. Radius of curvature 160 of first portion 122 of follower quick slot 88 is the maximum radius of curvature of the continuum of radii of curvature of first portion 122. Radius 166 of second portion 118 of follower guide slot 88 is larger than radius of curvature 160.

Reference circle 138 and center point 168 are positioned to lie on opposite sides of follower guide slot 88 as shown in FIG. 9. Thus, first portion 122 of follower guide slot 88 curves in a first direction, due to the continuum of radii which defines the involute shape of first portion 122 being positioned to lie on a first side of follower guide slot 88, and second portion 118 of follower guide slot 88 curves in a second direction, opposite to the first direction, due to radius 166 which defines the circular shape of second portion 118 being positioned to lie on a second side of follower guide slot 88.

Bottom step 30 is coupled to front leg 24 so that top surface 48 maintains a constant orientation relative to front leg 24 as front and rear frame members 23, 25 are moved between the opened and collapsed positions. Although the step stool 20, shown in FIGS. 1–3, includes only one bottom step 30 beneath top step 28, it is within the scope of this disclosure for additional steps 30 that are similar to bottom step 30 to be coupled to front leg 24 beneath top step 28. It is also within the scope of this disclosure for one or more steps 28 that move relative to front leg 24 to be coupled to front leg 24 beneath top step 28.

Rear frame member 25 includes a support foot 59 at each elbow portion 61 of rear legs 26 to provide step stool 20 with added stability when rear frame member 25 is in the opened position. Each front leg 24 of front frame member 23 is formed to include a slot 75 and each rear leg 26 of rear frame member 25 includes a flattened end 77 that extends through slot 75 into an interior region 79 of the respective front leg 24 as shown in FIG. 4. A pivot pin 81 couples each flattened end 77 to the respective front leg 24 at frame pivot axis 44. Dolly unit 33 is more fully described in a U.S. Patent Application titled STEP STOOL AND DOLLY APPARATUS, filed herewith on Sep. 25, 1998, by Roudebush et al. which is hereby incorporated by reference.

In use, a user unlocks front and rear frame members 23, 25 from the opened position by moving top step 28 upwardly about top step pivot axis 50 in the direction of arrow 130 as shown in FIG. 5. Moving top step 28 in direction 130 causes follower 36 to move out of locking notch 124 and into second portion 118 of follower guide slot 88 beneath locking notch 124 and adjacent to rear end 116 of follower guide slot 88. After top step 28 is moved in direction 130 to the position shown in FIG. 5, the user pivots front frame member 23 relative to the floor in the direction of arrow 132 and gravity acts on rear frame member 25 to pivot rear frame member 25 in the direction of arrow 134 toward front frame member 23. Movement of rear frame member 25 in direction 134 during movement of front frame member 23 in direction 132, causes follower 36 to move away from rear end 116 of follower guide slot 88 and through second portion 118 of follower guide slot 88 toward inflection point 126.

Movement of front frame member 23 in direction 132, after follower 36 is spaced apart from rear end 116 of follower guide slot 88, moves step stool 20 into the partly collapsed configuration shown in FIG. 6 in which rear frame member 25 is at an intermediate position between the opened and collapsed positions and in which follower 36 is positioned to lie at inflection point 126 between first portion 122 and second portion 118 of follower guide slot 88. Movement of rear frame member 25 from the opened position, shown in FIG. 5, toward the intermediate position, shown in FIG. 6, causes top step 28 to move downwardly about top step pivot axis 50 in the direction of arrow 136, shown in FIG. 6.

Continued movement of front frame member 23 in direction 132 moves rear frame member 25 from the intermediate position shown in FIG. 6 into the collapsed position shown in FIG. 7. During movement of rear frame member 25 from the intermediate position to the collapsed position, follower 36 moves through first portion 122 of follower guide slot 88 and top step 28 continues to move about top step pivot axis 50 in direction 136. When rear frame member 25 reaches the collapsed position, follower 36 is positioned to lie adjacent to front end 120 of follower guide slot 88 and top surface 46 of top step 28 is generally parallel with front and rear legs 24, 26 as shown in FIG. 7.

Thus, a user can move rear frame member 25 from the opened position where step 28 is oriented at a first angle relative to front frame member 23 to the collapsed position where step 28 is oriented at a second angle relative to front frame member 23 by grasping top step 28 with one hand and moving top step 28 in direction 130 while simultaneously grasping curved top portion 58 of front frame member 23 with the other hand and pivoting front frame member 23 in direction 132 relative to the floor. After front frame member 23 is moved in direction 132 by a slight amount and after rear frame member 25 moves in direction 134 by a slight amount, due to gravity, follower 36 is spaced apart from rear end 116 of slot 88 and the user can let go of top step 28 while continuing to pivot front frame member 23 in direction 132 relative to the floor. Movement of rear frame member 25 about frame pivot axis 44 toward front frame member 23 in direction 134, due to movement of front frame member 23 in direction 132 relative to the floor, automatically moves top step 28 about top step pivot axis 50 in direction 136 until front frame member 23 reaches the generally vertical orientation, shown in FIG. 7, at which point rear frame member 25 is in the collapsed position and top step 28 is in the vertical storage position.

Movement of rear frame member 25 from the collapsed position to the opened position and the corresponding movement of top step 28 from the vertical storage position to the horizontal use position is similar but opposite to movement of rear frame member 25 from the opened position to the collapsed position and the corresponding movement of top step 28 from the horizontal use position to the vertical storage position. For example, moving front frame member 23 relative to the floor in a direction opposite to direction 132 causes rear frame member 25 to pivot in a direction opposite to direction 134 so that front and rear frame members 23, 25 move from the collapsed position, shown in FIG. 7, to the intermediate position, shown in FIG. 6.

Movement of rear frame member 25 from the collapsed position to the intermediate position causes top step 28 to move about top step pivot axis 50 in direction 130 from the vertical storage position, shown in FIG. 7, to the position shown in FIG. 6.

When rear frame member 25 is in the intermediate position, shown in FIG. 6, the user grabs top step 28 and moves top step 28 in direction 130 toward the horizontal use position. Movement of top step 28 in direction 130 toward the horizontal use position drives rear frame member 25 from the intermediate position to the opened position shown in FIG. 5. The user then lets go of top step 28 and top step 28 moves downwardly about top step pivot axis 50 in direction 136 so that follower 36 are received in locking notch 124 to lock front and rear frame members 23, 25 in the opened position as shown in FIG. 4.

The interaction between follower 36 and top step 28 allows the user to move step stool 20 between the opened and collapsed positions while standing in front of step stool 20 without the need to reach around or walk around the side or rear of step stool 20 and without the need to grasp rear frame member 25. Step stool 20 has no linkages or separate mechanisms attached to top step 28 that need to be manipulated by the user to move rear frame member 25 between the opened and collapsed positions. The user only needs to grasp front frame member 23 and top step 28. In addition, the shape of follower guide slot 88 provides a smooth feel to the user while the user grasps top step 28 during pivoting movement of rear frame member 25 relative to front frame member 23. Movement of follower 36 through follower guide slot 88 directs or controls the movement of top step 28 relative to front and rear frame members 23, 25 as previously described.

Although the invention has been described in detail with reference to a certain preferred embodiments, variations and modifications exist within the scope and spirit of the invention as described and as defined in the following claims.

We claim:

1. A step stool comprising
   a frame including a front frame member having a bottom end and a rear frame member having a bottom end, the front and rear frame members being coupled together for movement between an opened position in which a bottom end of the front frame member is spaced apart from the bottom end of the rear frame member and a collapsed position in which the bottom ends of the front and rear frame members are positioned to lie adjacent to one another,
   a step being pivotably coupled to the front frame member for movement between a use position in which the step is oriented at a first angle relative to the front frame member and a storage position in which the step is oriented at a second angle relative to the front frame member, and
   a guide unit coupled to the step, the guide unit including a generally S-shaped guide track and a follower coupled to the rear frame member to engage the guide track, the follower being moved along the guide track in curvilinear fashion following the S-shape as the rear frame member moves along the front frame member, and movement of the follower relative to the guide track moves the step between the use and storage positions.

2. The step stool of claim 1, wherein the guide unit includes a side wall coupled to the step and the guide track is formed in the side wall.

3. The step stool of claim 2, wherein the guide includes an edge with a slot defining the follower guide track and the follower extends into the follower guide slot.

4. The step stool of claim 3, wherein the follower includes a pin and a roller mounted on the pin for rotation, the roller is arranged to engage the edge of the follower guide slot so that movement of the pin within the follower slot results in rotation of the roller on the pin.

5. The step stool of claim 1, wherein the guide track includes a first portion that is generally involute in shape and a second portion that is generally circular in shape.

6. The step stool of claim 1, wherein the guide track includes a first end and a second end, the step includes a top surface, the first end of the guide track is spaced apart from the top surface of the step by a first distance, the second end of the guide track is spaced apart from the top surface of the step by a second distance, and the first distance is smaller than the second distance.

7. The step stool of claim 1, wherein a portion of the guide track is involute in shape.

8. The step stool of claim 1, wherein the guide track includes a first end and a second end spaced apart from the first end, the step pivots about a step pivot axis and includes a top surface, a reference circle is defined as having a center at the step pivot axis and as being tangent to the first end of the guide track, an involution initiation point is defined on the reference circle along a coordinate radius arranged to extend from the step pivot axis in perpendicular relation with the top surface, and the guide track includes a first portion beginning generally at the involution initiation point and following an involute curve that is determined by the circumference of the reference circle.

9. The step stool of claim 8, wherein the first portion of the guide track follows the involute curve through an involution unwrapping angle of greater than 90 degrees from the coordinate radius.

10. The step stool of claim 9, wherein the first portion of the guide track follows the involute curve through an involution unwrapping angle of about 135 degrees from the coordinate radius.

11. The step stool of claim 10, wherein the guide track further includes an apex portion that is closer to the top surface than any other portion of the guide track and the apex portion is positioned to lie on a line that is generally tangent to the reference circle and generally parallel to the coordinate radius.

12. A step stool comprising
a frame including a front frame member having a bottom end and a rear frame member having a bottom end, the front and rear frame members being coupled together for movement between an opened position in which the bottom ends of the front and rear frame members are spaced apart from one another and a collapsed position in which the bottom ends of the front and rear frame members are positioned to lie adjacent to one another,
a step pivotably coupled to the front frame member for movement about a step pivot axis between a use position and a storage position, and
a guide unit coupled to the step and being formed to include a guide track having an S-shaped track with an involute shaped portion and a follower coupled to the rear frame member and arranged to engage in and follow the involute shape of the guide track, the follower moved along the guide track and the guide being shaped so that curvilinear movement of the follower by the guide track moves the step between the use and storage positions as the rear frame member is moved between the opened and collapsed positions.

13. The step stool of claim 12, wherein the guide track includes a circularly curved portion contiguous with the involute portion.

14. The step stool of claim 13, wherein the circularly curved portion of the guide track curves in a first direction and the involute portion of the guide track curves in a second direction opposite to the first direction so that the guide track is generally S-shaped.

15. The step stool of claim 13, wherein the involute portion of the guide track has a continuum of radii of curvature of varying length that are positioned to lie on one side of the guide track and the circularly curved portion of the guide track has a radius of curvature of generally constant length on an opposite side of the guide track.

16. The step stool of claim 13, wherein the involute portion of the guide track has a continuum of radii of curvature that vary between a minimum length and a maximum length, the circularly curved portion of the guide track has a radius of curvature of generally constant length, and the generally constant length is larger than the maximum length.

17. The step stool of claim 13, wherein the circularly curved portion of the guide track cooperates with the involute portion of the guide track to provide the guide track with an inflection point.

18. The step stool of claim 13, wherein the guide track includes a locking notch contiguous with the circularly curved portion of the guide track and the step is secured in the first position when the follower is received by the locking notch.

19. The step stool of claim 12, wherein the step includes a top surface and the guide track is positioned to lie beneath the top surface of the step when the step is in the use position.

20. The step stool of claim 12, wherein the guide track includes a first end and a second end, the step pivots about a step pivot axis, the first end is generally horizontally aligned with the step pivot axis and the second end is generally vertically aligned with the step pivot axis when the step is in the use position, and the second end is generally horizontally aligned with the step pivot axis when the step is in the storage position and the front leg is in a generally vertical orientation.

21. The step stool of claim 12, wherein guide unit includes a side wall that extends from the top surface of the step and the guide track is formed in the side wall.

22. The step stool of claim 21, wherein the guide track includes an edge formed in the side wall defining a follower guide slot and the follower comprises a pin and a roller mounted on the pin for rotation, the roller engages the edge of the follower guide slot so that movement of the pin within the follower guide slot results in rotation of the roller on the pin.

23. A step stool comprising
a frame including a front frame member having a bottom end a rear frame member having a bottom end, the front and rear frame members being coupled together for movement between an opened position in which the bottom ends of the front and rear frame members are spaced apart from one another and a collapsed position in which the bottom ends of the front and rear frame members are positioned to lie adjacent to one another,
a step having a front edge, a rear edge, and a top surface arranged to extend between the front and rear edges, the step being pivotably coupled to the front frame member for movement about a step pivot axis between a use position in which the top surface is oriented at a first angle relative to the front frame member and a storage position in which the top surface is oriented at a second angle relative to the front frame member, and a guide unit coupled to the step and including an S-shaped follower guide slot and a follower, the follower guide slot being formed in a wall to include a front end, a first guide slot portion arranged to extend from the front end, a rear end, a second guide slot portion arranged to extend from the rear end to meet with the first portion, and a locking notch at the rear end, the wall being coupled to the step, the follower being coupled to the rear frame member and arranged to extend therefrom into the follower guide slot, the step being secured in the use position when the follower is received in the locking notch, the follower guide slot being configured so that tilting the front frame member about its bottom end toward a generally vertical orientation relative to the floor surface when the frame is in the opened position and then pivoting the step relative to the front frame member so that the rear edge of the step moves upwardly, causes the follower to move out of the locking notch and into the first portion of the slot allowing the rear frame member to pivot toward the front frame member, the follower guide slot being configured so that the step pivots downwardly relative to the front frame member as the rear frame member pivots toward the front frame member after the follower moves out of the locking notch.

24. The step stool of claim 23, wherein the first portion of the follower guide slot curves in a first direction, the second portion of the follower guide slot curves in a second direction opposite to the first direction, and the follower guide slot includes an inflection point at which the first and second portions meet.

25. The step stool of claim 24, wherein the first portion of the follower guide slot is involute in shape and the second portion of the follower guide slot is circular in shape.

26. The step stool of claim 23, wherein the step pivots about a step pivot axis and the rear end of the follower guide slot is generally horizontally aligned with the step pivot axis when the frame is in the opened position and the step is in the storage position.

27. The step stool of claim 26, wherein the first portion of the follower guide slot is involute in shape.

28. The step stool of claim 23, wherein the locking notch extends in a direction that is generally perpendicular to the top surface.

29. The step stool of claim 28, wherein the first portion of the follower guide slot is involute in shape.

* * * * *